April 21, 1970     D. E. WRIGHT ET AL     3,508,055
SECURITY SYSTEM UTILIZING PENETRATING RADIATION
Filed May 12, 1966
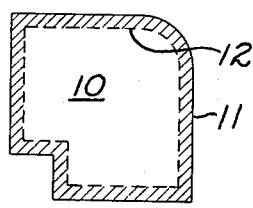
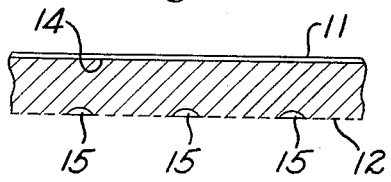
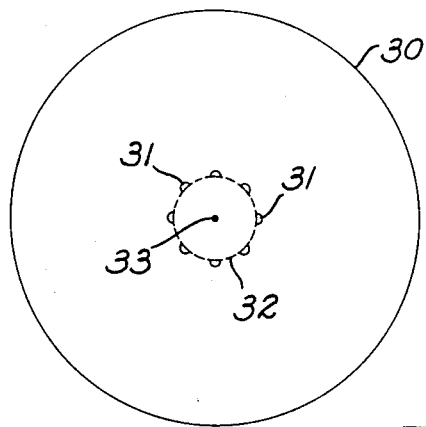
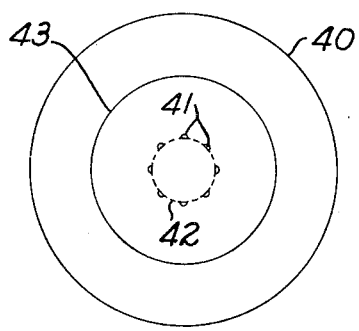
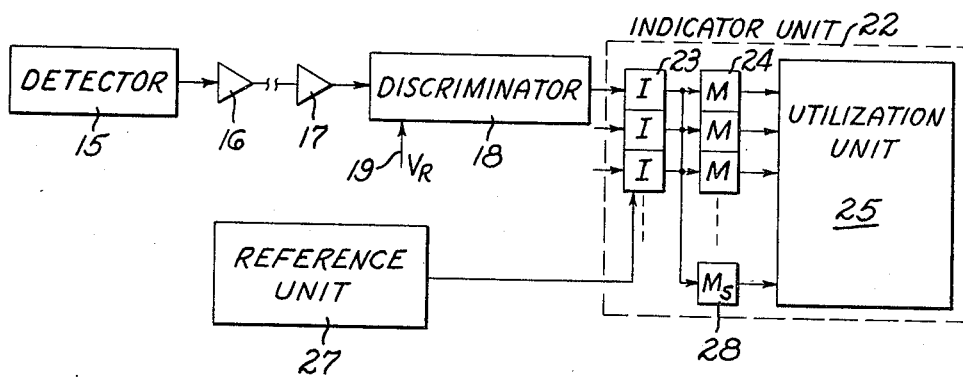
INVENTORS.
DONALD E. WRIGHT
ANDREW H. GARRY GIBSON
BY THEIR ATTORNEYS.
HARRIS, KIECH, RUSSELL & KERN

United States Patent Office 3,508,055
Patented Apr. 21, 1970

3,508,055
SECURITY SYSTEM UTILIZING PENETRATING RADIATION
Donald E. Wright and Andrew H. Garry Gibson, Upland, Calif., assignors, by mesne assignments, to Tyco Laboratories, Inc., a corporation of Massachusetts
Filed May 12, 1966, Ser. No. 549,690
Int. Cl. G01t 1/16
U.S. Cl. 250—83.3      9 Claims

ABSTRACT OF THE DISCLOSURE

A security system for detecting the presence of intruders in an area under surveillance. A source of penetrating radiation disposed at the perimeter of the area and a plurality of detectors within the area, with the detector output providing a measure of the radiation absorption by an intruder and thereby an indication of the identity of the intruder.

---

This invention relates to a system for detecting the presence of an intruder within an area under surveillance such as an industrial plant, an airfield, a supply dump, or the like. It is an object of the invention to provide such a security system which will provide an indication of the presence of an intruder. A further object is to provide such a system which will also provide information on the location, identification and movements of the intruder. An additional object is to provide such a system which may incorporate various visual and oral indicating and alarm devices and/or automatic controls relative to a security system.

It is an object of the invention to provide a security system that is not adversely affected by variations in terrain, trees, heavy vegetation, rain, fog, light and darkness. An additional object is to provide such a system which may be installed in a variety of locations, in the air, on the ground or under the ground, and a system which is readily concealed. A further object is to provide such a system which is low in cost, light in weight, has low power requirements, and is reliable and dependable. A particular object is to provide such a system which is substantially immune to jamming and spoofing.

It is an object of the invention to provide a system for detecting an intruder within an area under surveillance including a source of penetrating radiation such as gamma rays or X-rays, with the source disposed substantially continuously along the perimeter of the area, and a plurality of radiation detectors disposed within the area and spaced from the source defining a surveillance zone between the source and detectors with each of the detectors disposed to receive radiation from an extended portion of the source. An additional object is to provide such a system including indicating means for determining the radiation intensity at the detectors to provide an indication of the presence of and information on the identity of an intruder in the zone.

It is a particular object of the invention to provide such a system wherein the outputs of individuals detectors or groups of detectors may be used to provide information on the size, composition, location and movement of the intruder. Another object is to provide such a system wherein the outputs of the detectors may be combined to provide a single indication of any intrusion into the area.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:
FIG. 1 is a plan view illustrating the application of the security system of the invention to a large site such as an industrial plant;
FIG. 2 is an enlarged view of a portion of the perimeter of the site of FIG. 1;
FIG. 3 is a plan view illustrating an alternative arrangement of the security system;
FIG. 4 is a plan view illustrating another alternative arrangement; and
FIG. 5 is an electrical block diagram of a preferred form of circuitry for the system.

FIG. 1 illustrates a site 10 for an industrial plant, an airfield or the like which may have a security perimeter indicated by the solid line 11. In a typical situation, this may comprise a fence many miles in length. A source of penetrating radiation is disposed along the perimeter 11. The source may take several forms, such as a series of X-ray tubes or a radioactive solid producing gamma rays such as Am 241 or Cs 137, or a radioactive gas producing gamma rays such as Kr 85. A radioactive material is preferable over a series of X-ray tubes because of the ease in obtaining a substantially continuous source around the perimeter and the fact that the radioactive sources do not require a power supply. The radioactive solid material may be made in the form of a wire and the radioactive gas may be carried in a tube. The source, regardless of its form, may be laid on the ground, may be buried, may be mounted on or incorporated into a fence, or may be supported in any other desired fashion. The particular method of installing the source does not adversely affect the operation of the system and it is seen that a source in the form of a small wire or tube is readily concealed.

A plurality of radiation detectors is disposed within the perimeter of the area 10 and the detectors are spaced from the source defining a surveillance zone between the source and the detectors. In FIG. 1, the detectors are disposed along the dashed line 12 with the surveillance zone indicated by the shaded area between the perimeter 11 and the line 12. FIG. 2 illustrates an enlarged portion of the site of FIG. 1 with a source wire 14 disposed along the perimeter 11 and a plurality of detectors 15 spaced along the line 12. While a single detector 15 has been indicated at each installation, a plurality of detectors may be utilized in a group or array at each installation 15 to provide increased sensitivity and/or a wider angle of detection.

Any of the presently available radiation detectors may be utilized, such as gas or solid state ion chambers, proportional counters, geiger tubes, and liquid or solid scintillators. Referring to the circuit of FIG. 5, the output of a detector or a group of detectors is connected to a preamplifier 16 normally positioned adjacent the detector. The preamplifier output may be transmitted to a central control station by wire or by telemetering. The output may be further amplified at 17 and connected to a pulse level discriminator 18. The discriminator 18 is conventional in operation and functions to discriminate between low level noise pulses and high level pulses produced by the detector as a result of radiation from the source. The discriminator may also be operated to discriminate between the desired output pulses from the detector and very high level pulses produced by cosmic radiation. A reference voltage is provided to the discriminator on line 19 and the discriminator produces an output pulse of a controlled magnitude and duration for each input pulse of a magnitude greater than that determined by the reference voltage. A second reference voltage may be utilized as a high level limit when desired.

3

The output from the discriminator is connected to an indicator unit 22 along with the outputs from all of the other detectors and discriminators. The indicator unit may include a conventional integrator 23 which provides an output voltage varying in amplitude as a function of the rate at which input pulses are received. The integrator output may be coupled to a meter or recorder or other indicating device 24. The integrator output may also be connected through the meter 24 or directly to a utilization unit 25, which may incorporate an alarm such as a bell or light or other suitable device which is energized when the output falls below a predetermined level. The indicator unit 22 may incorporate similar integrators and indicating devices for each of the detectors or groups of detectors. The system may be used to provide an alarm on entry of certain types of intruders. Alternatively the system may be used to provide a record of the number, type and time of passage of intruders. An intruder may be a person, an animal, a vehicle or any object which moves or is moved into the zone.

A reference circuit 27 may be incorporated to eliminate the effects of detector thermal noise, electronics noise from temperature variations, and space radiation effects. The reference circuit 27 will incorporate a detector and associated circuitry identical to that utilized with the detectors 15, with the reference detector shielded from the source 14. In a typical arrangement, the D.C. voltage from the reference circuit 27 is inverted and combined with the D.C. voltage from the working detector integrator so that the integrator output will vary as a function only of variations in radiation received from the source 11.

If desired, the outputs of the integrators 23 may be summed and coupled to an indicating device 28 which provides an indication for the entire surveillance zone. In an alternative arrangement, the outputs from all of the detectors can be combined prior to integrating to provide only a single output signal.

With the system in operation, the outputs at the indicating devices 24 may be noted. Ordinarily these will vary from detector to detector, depending upon the conditions of the local terrain and the positions of the detectors and the source. A decrease in output from the initial value indicates the presence of an intruder within the surveillance zone, with the magnitude of the decrease being a function of the radiation absorption and scattering by the intruder. The alarm may be adjusted to be actuated for any change from the normal output condition or may be adjusted to be operative when the change exceeds a predetermined value. The system is readily calibrated to determine the magnitude of change produced by a bird, a small animal, a person, a vehicle, and the like. The output at a detector will be a function of the mass, the geometrical area, and the material composition of the object between the source and the detector. The number of detectors affected will be a function of the area of the object. Therefore, by reading the outputs of individual detectors or groups of detectors, an indication is obtained of the location of the intruder, the mass of the intruder, and the area of the intruder. The detector outputs also provide information on the movement of the intruder, with the absorption increasing when the intruder moves toward the detectors, decreasing for motion away from the detectors, and remaining constant for movement parallel to the detector line. This type of information readily provides for discrimination between a person and a flying bird, even though both may have similar area, since one will have substantially greater mass than the other. The information provides for discrimination between a person and a solid metal object, even though both may have similar mass, because the person will occupy a greater physical area. The tripping level for the alarm 25 may be set so that the alarm is tripped only for intruders having the characteristics of a person or a vehicle and not for intruders having the characteristics of a bird or rabbit.

An alternative arrangement of the security system is illustrated in FIG. 3 wherein a source 30 of penetrating radiation is disposed in a ring about an area under surveillance. Detectors 31 are disposed in an inner ring indicated by the dashed line 32. An additional source 33 of penetrating radiation may be positioned at the center of the area if desired. Each detector or group of detectors may be oriented to receive radiation from the source 30 and from the source 33. Alternatively, some of the detectors or groups of detectors may be utilized to receive radiation only from the source 30 while others may be utilized to receive radiation only from the source 33.

Another alternative arrangement is illustrated in FIG. 4, wherein a source 40 of penetrating radiation is disposed around the perimeter of an area and a plurality of detectors 41 is disposed along the line 42. Another source 43 of penetrating radiation is positioned within the area between the source 40 and the detector line 42 so that the detectors 41 receive radiation from both sources. This arrangement may be utilized with a smaller area such as is shown in FIG. 3 as well as with a larger area such as is shown in FIG. 1. With the arrangement of FIG. 4, an intruder in the zone between the sources 40, 43 will produce an indication in the manner described previously. The presence of an intruder between the source 43 and the detector line 42 will produce a much greater change in indicated output since radiation from both sources is being absorbed. The arrangement of FIG. 4 may be utilized to provide for redundancy in the system and also for a higher degree of detection and accuracy for close-in intruders.

The security system utilizing the gamma ray of X-ray radiation is not adversely affected by vegetation, discontinuities in terrain, changes in weather and the like. The penetrating radiation permits positioning of the source and detectors in any convenient location and in any concealed location. Bureal within the ground to reasonable depths has no adverse effect on the operation. After installation, the signal level for each detector is determined with no intruders present, giving a reference signal which takes into account the location of the source and detector and the condition of the intervening terrain.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a system for detecting within an area under surveillance, an intruder of predetermined radiation adsorption and discriminating against detection of an intruder of lesser radiation absorption, the combination of:
    a source of X-ray or gamma ray radiation disposed substantially continuously along the perimeter of the area;
    a plurality of detectors disposed within said area and spaced from said source defining a surveillance zone between said source and detectors with each of said detectors disposed to receive radiation from an extended portion of said source; and
    indicating means for determining the radiation intensity at said detectors to provide an indication of an intruder of such predetermined radiation adsorption in said zone.

2. A system as defined in claim 1 in which said indicating means includes a plurality of indicating devices with each indicating device energized by a different detector to provide an indication of the location of the intruder within said zone and of the mass area and material composition of the intruder.

3. A system as defined in claim 1 in which said indicating means includes means for integrating the outputs of said detectors for providing an output signal varying in magnitude as a function of the radiation adsorption by the intruder.

4. A system as defined in claim 1 in which said indicating means includes:
   means for producing a first signal varying as a function of the output of a detector;
   a reference source comprising an additional detector shielded from said radiation source and means for producing a second signal varying as a function of the output of said additional detector; and
   means for comparing said first and second signals.

5. A system as defined in claim 1 including a second source of penetrating radiation positioned within said zone between said first source and detectors.

6. A system as defined in claim 1 in which said detectors enclose a second surveillance zone, and including a second source of penetrating radiation positioned within said second zone.

7. A system as defined in claim 1 in which said source is a radioactive wire.

8. A system as defined in claim 1 in which said source in a tube of radioactive fluid.

9. A system as defined in claim 1 in which said source is a series of point sources distributed along the perimeter.

References Cited

UNITED STATES PATENTS

| | | | |
|---|---|---|---|
| 2,086,087 | 7/1937 | Melton | 250—83 X |
| 2,401,723 | 6/1946 | Deming | 250—106 X |
| 2,983,354 | 5/1961 | Ember et al. | 250—106 X |

ARCHIE R. BORCHELT, Primary Examiner

U.S. Cl. X.R.

250—83, 106

PO-1050
(5/69)

UNITED STATES PATENT OFFICE
CERTIFICATE OF CORRECTION

Patent No. 3,508,055      Dated  April 21, 1970

Inventor(s) DONALD E. WRIGHT and ANDREW H. GARRY GIBSON

It is certified that error appears in the above-identified patent and that said Letters Patent are hereby corrected as shown below:

Col. 1, l. 48 "of" should read --or--
  Page 2, l. 7 of specification.

Col. 1, l. 60 "individuals" should read --individual--
  Page 2, l. 18 of specification.

Col. 4, l. 34 "of" should read --or--
  Page 9, l. 21 of specification.

Col. 4, l. 39 "Burial" is misspelled.
  Page 10, l. 1 of specification.

Claim 1, col. 4, l. 53 "adsorption" should read --absorption--
  Claim 1, l. 3 in amendment of May 2, 1968.

Claim 1, col. 4, l. 66 "adsorption" should read --absorption--
  Claim 1, l. 15 of amendment of May 2, 1968.

Claim 3, col. 5, l. 2 "adsorption" should read --absorption--
  Claim 3, l. 4 of specification.

Claim 8, col. 6, l. 2 "in" should read --is--
  Claim 8, l. 2 of specification.

SIGNED AND SEALED
SEP 1 - 1970

(SEAL)
Attest:

Edward M. Fletcher, Jr.
Attesting Officer

WILLIAM E. SCHUYLER, JR.
Commissioner of Patents